Oct. 29, 1963 T. J. REED 3,108,572
CATTLE FEED DISTRIBUTOR
Filed Jan. 8, 1962 4 Sheets-Sheet 1
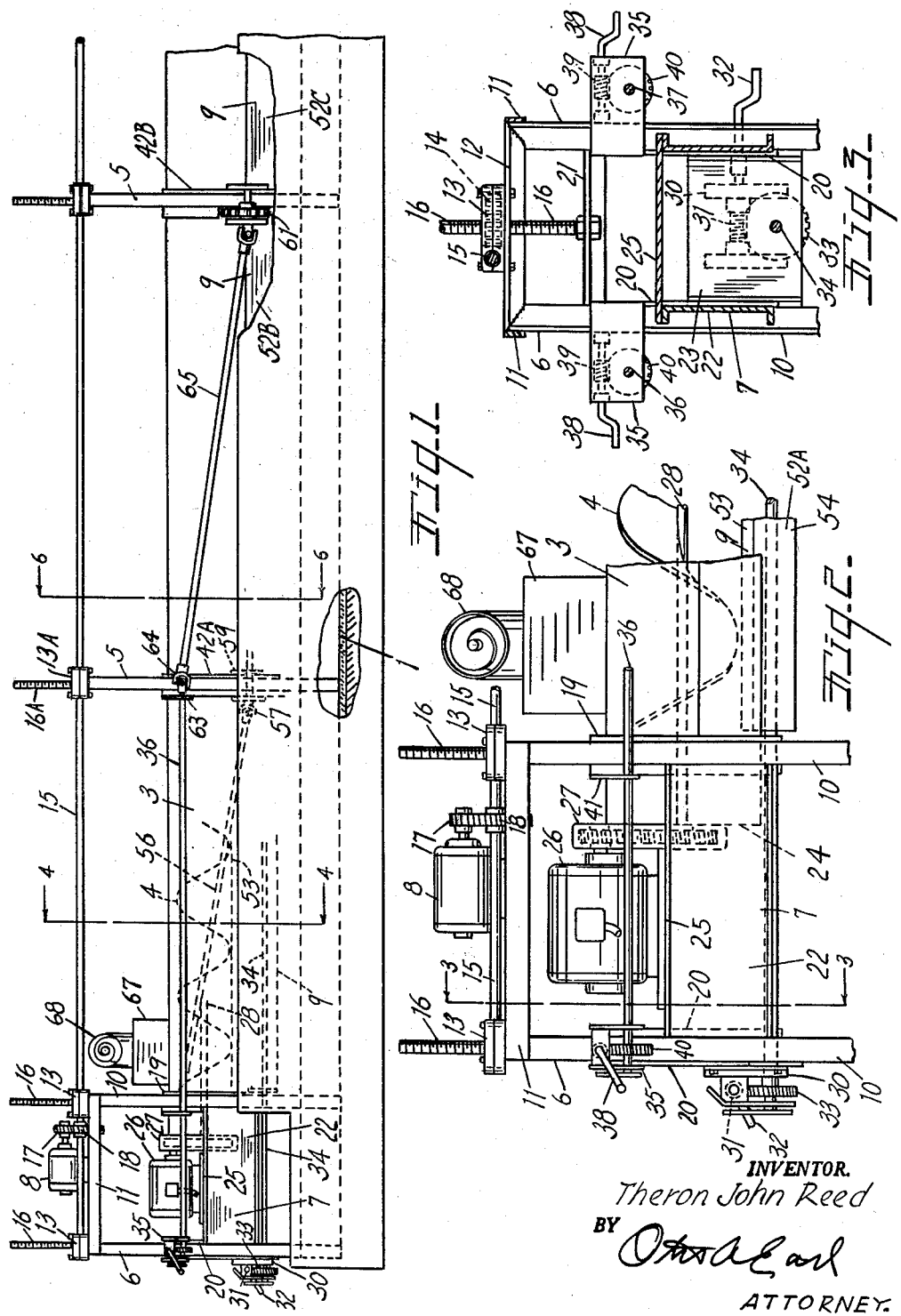
INVENTOR.
Theron John Reed
BY
ATTORNEY.

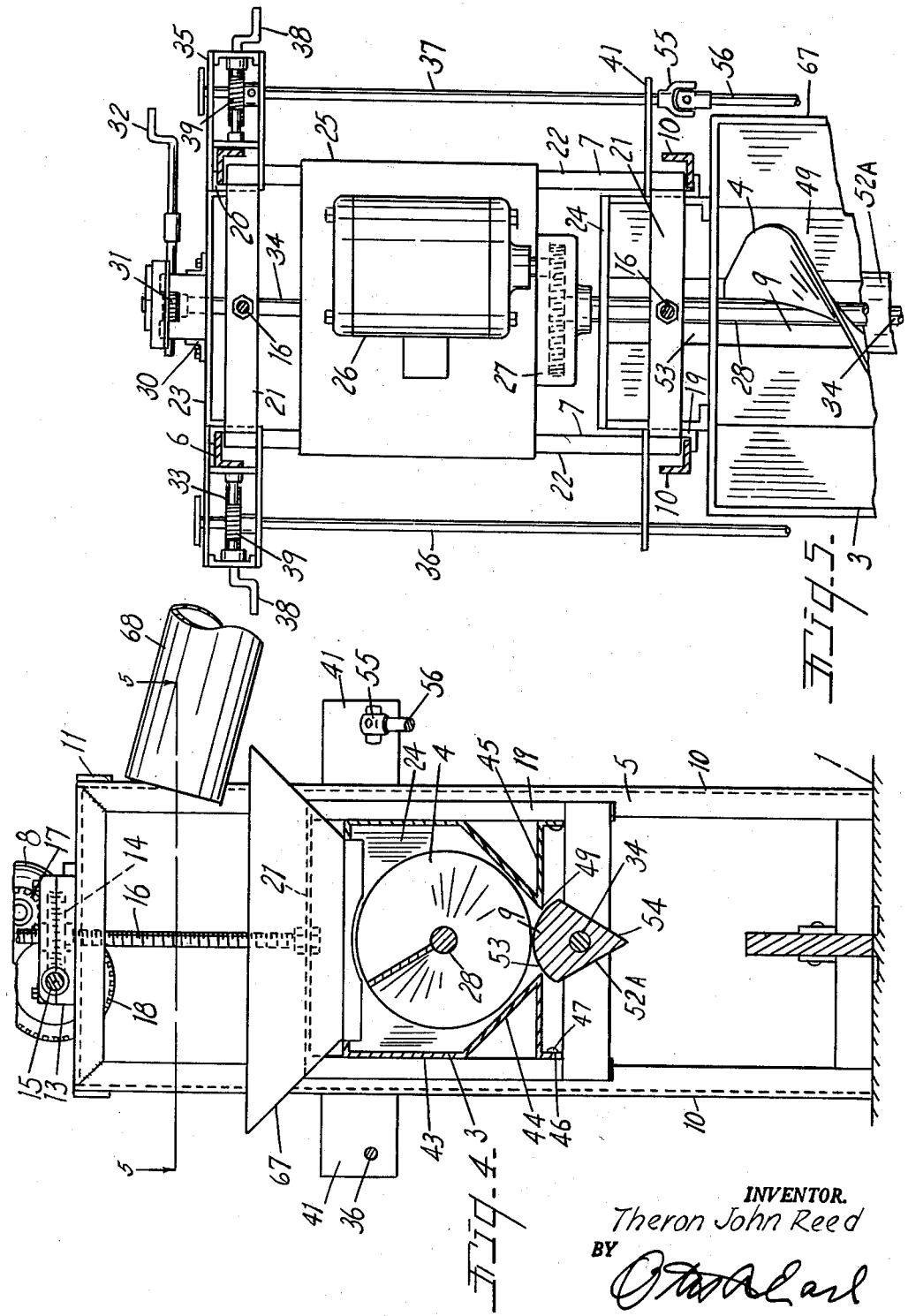

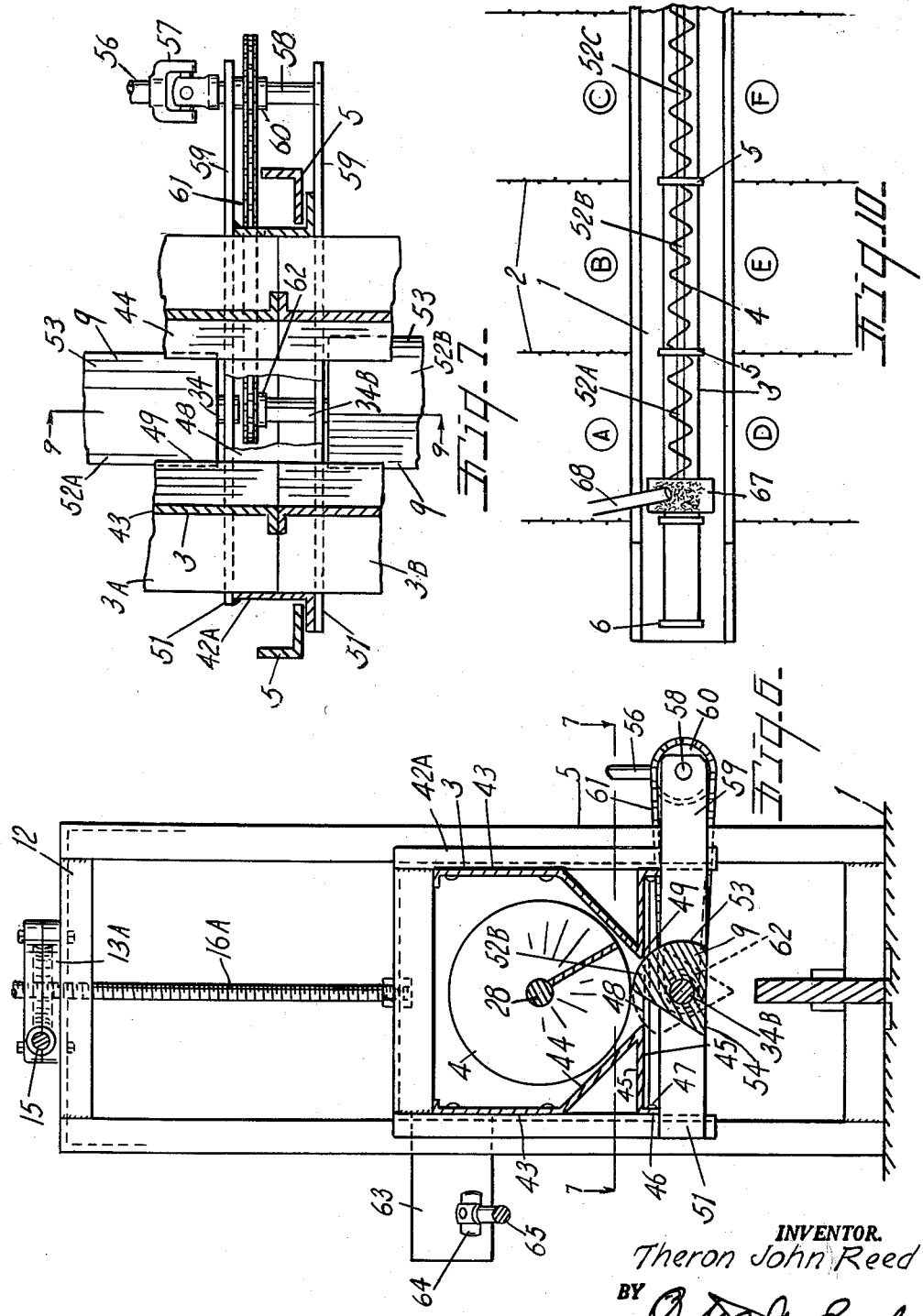

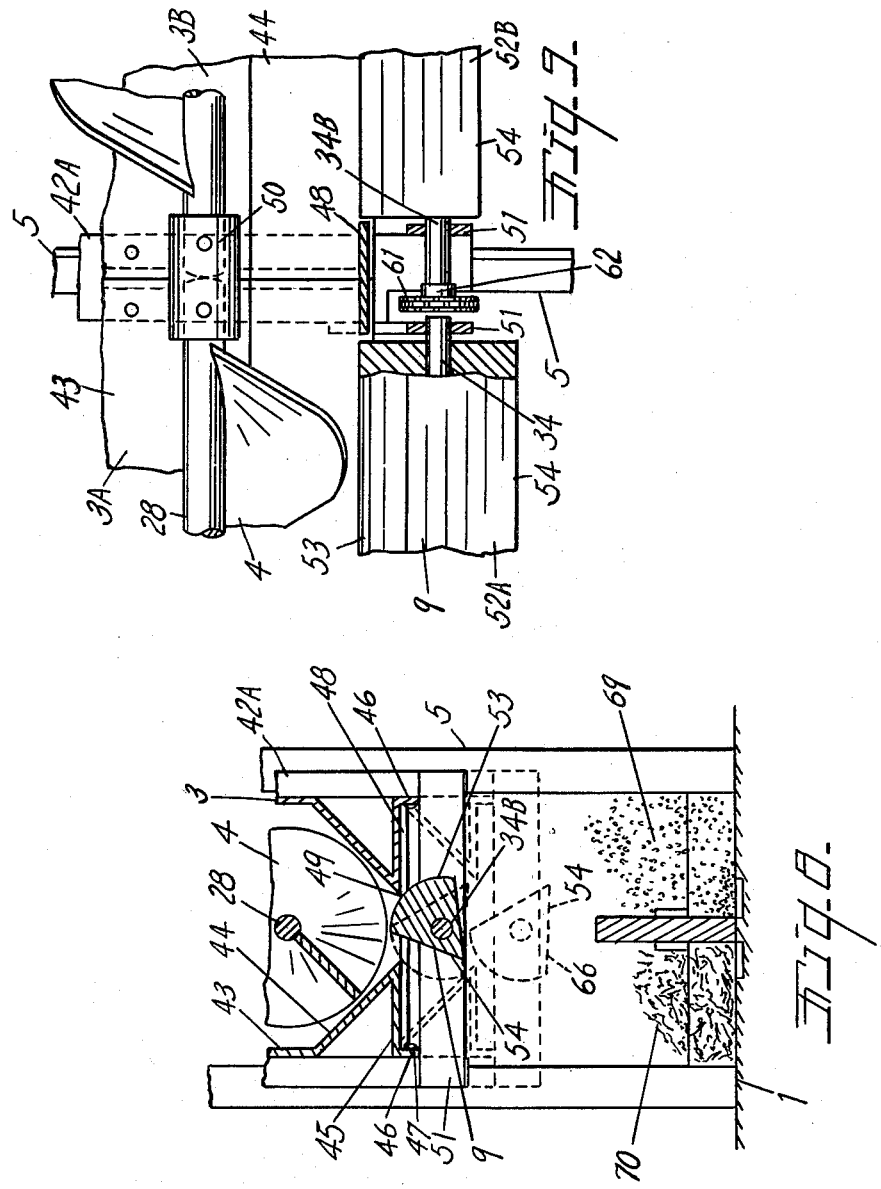

United States Patent Office 3,108,572
Patented Oct. 29, 1963

3,108,572
CATTLE FEED DISTRIBUTOR
Theron John Reed, Burr Oak, Mich., assignor, by mesne assignments, to American Planter Co., Burr Oak, Mich., a corporation of Michigan
Filed Jan. 8, 1962, Ser. No. 164,790
9 Claims. (Cl. 119—52)

This invention relates to improvements in a cattle feed distributor. This invention is a continuation in part of my copending application Serial No. 814,854, filed May 21, 1959, now Patent No. 3,051,294, for Cattle Feed Distributing Apparatus. The principal objects of this invention are:

First, to provide feed distributing apparatus which will permit different amounts of different types of cattle feed to be delivered selectively to different cattle feeding areas or stations with a minimum of effort.

Second, to provide cattle feeding apparatus which is controllable and adjustable from a central feeding point to distribute feed selectively to different cattle feeding stations.

Third, to provide a cattle feed distributor which is effective to deliver and deposit one type of feed such as pellets in one area and a different type of feed such as silage in selected quantities in another area and a different type such as a mixture of pellets and silage in still a third area.

Fourth, to provide cattle feed distributing apparatus in which an elongated delivery trough and feed auger is vertically adjustable above a feed receiving bed to determine the amount of material which will be deposited on the bed and in which a plurality of valves controlling different sections of the trough may be independently adjusted to prevent the deposit of material or select the side of the bin to which the material will be delivered along each section of the trough.

Other objects and advantages of the invention will be apparent from a consideration of the description and claims. The drawings, of which there are four sheets, illustrate a highly practical form of the feed distributing apparatus.

FIG. 1 is a fragmentary side elevational view of a feeding bed or bunk divided into three sections and provided with the feed distributing apparatus of the invention.

FIG. 2 is a fragmentary enlarged side elevational view of the receiving end of the distributor illustrating the driving connections for driving the distributor, adjusting its elevation and regulating the valves of the several sections.

FIG. 3 is a fragmentary transverse cross sectional view taken along the plane of the line 3—3 in FIG. 2.

FIG. 4 is a fragmentary enlarged cross sectional view through the first section of the conveyor taken along the plane of the line 4—4 in FIG. 1.

FIG. 5 is a fragmentary horizontal cross sectional view taken along the plane of the line 5—5 in FIG. 4 and showing the distributing conveyor drive and valve adjusting mechanism in plan view.

FIG. 6 is a fragmentary vertical cross sectional view taken along the plane of the line 6—6 in FIG. 1 showing the valves and valve adjusting mechanism of two sections of the distributor.

FIG. 7 is a fragmentary enlarged horizontal cross sectional view taken along the plane of the line 7—7 in FIG. 6.

FIG. 8 is an enlarged cross sectional view through the conveyor showing alternate adjusted positions of the valve and distributor.

FIG. 9 is a fragmentary vertical cross sectional view taken along the plane of the line 9—9 in FIG. 7.

FIG. 10 is a plan conventionally illustrating an arrangement of the feed distributor of the invention to selectively deliver feed to six different feeding areas.

As appears in FIGS. 1 and 10 the distributing apparatus of the invention is designed to deliver different feeds selectively to different feeding stations along a feed platform or bunker 1. The bunker is an elongated platform having fences 2 extending from opposite sides thereof to define a plurality of feed lots or stations A, B, C, D, E and F to which different groups of cattle may be admitted for controlled feeding of each group. The distributing apparatus consists of a horizontal distributor trough 3 having a spiral screw conveyor 4 rotatably positioned therein. The trough 3 and the screw conveyor are vertically adjustably supported by a plurality of upright frames 5. A rectangular framework 6 at the receiving end of the distributor supports a vertically adjustable supporting platform 7 for the screw conveyor drive and carries power mechanism including a motor 8 for simultaneously adjusting the platform 7 and the trough supports at the upright frames 5. Each section of the trough 3 between the fences 2 is provided with a separate control valve 9 and mechanism for adjusting the three valves is vertically adjustably carried by the platform 7 as will be described presently.

Considering the driving section of the distributing apparatus in greater detail attention is directed to FIGS. 2 to 5 which illustrate the rectangular framework 6 to consist of uprights 10 of angular cross section fixedly mounted in the bed 1 and connected at their upper ends by side pieces 11 and cross pieces 12. The cross pieces 12 support gear boxes 13 enclosing horizontal gears 14 meshed with worms on a longitudinal shaft 15. The gears 14 are in turn threadly engaged with vertical lift screws 16. The motor 8 supported on the side members 11 drives a worm 17 engaged with the gear 18 on the shaft 15, so that rotation of the motor raises or lowers the lift screws 16 depending upon the direction of rotation of the motor.

The platform 7 which is vertically slidably supported within the frame 6 consists of corner slides 19 and 20 of angle shaped cross section connected at the top by cross pieces 21 to which the lift screws 16 are secured. The four slides 19 and 20 are connected by horizontal side members 22 of channel shaped cross section and by a rear cross plate 23. The forward slide members 19 receive and are connected by the rear end of the distributor trough 3 which has an integral transverse back wall 24. A cross piece 25 extending between the channel shaped side members 22 support a motor 26 which is connected through the gear box 27 to the shaft 28 of the distributor screw 4. It will thus be seen that the screw 4 moves upwardly and downwardly with the distributor trough 3 and the driving motor 26.

On its rear side the cross plate 23 supports angle brackets 30 which carry a transverse worm 31 with a crank 32 on one end. The worm meshes with a gear 33 on the rear end of a first valve adjusting shaft 34 extending longitudinally along the bottom of the first section of the distributor trough as will be described. The upright slides 20 have laterally projecting plates 35 at their upper ends which support longitudinally extending valve regulating shafts 36 and 37 as well as adjusting cranks 38 having worms 39 engaged with gears 40 on the shafts. The forward slides 19 carry projecting support plates 41 for supporting the shafts 36 and 37. It will be evident that the valve regulating shafts 34, 36 and 37 and their adjusting cranks will move upwardly and downwardly with the platform carriage 7 and the distributing screw auger 4.

Outwardly or to the right of the drive section 6 as viewed in FIG. 1, the first supporting upright 5 for the distributor trough 3 consists of a pair of spaced uprights of angular section as shown in FIG. 7 slidingly supporting a rectangular frame 42A which embraces the ends of two adjacent sections of the distributor trough. As appears more clearly in FIG. 6 the frame 42A has a vertical adjusting screw 16A secured to its upper cross piece and extending upwardly through a gear box 13A similar to the gear boxes 13 on the drive frame. The shaft 15 extends through the gear box 13 to raise and lower the frame 42A at the same time as the motor platform 7.

The conveyor trough 3 consists of two opposed side members 43 having inwardly inclined bottom walls 44 and outwardly turned stiffening flanges 45. The side members 43 and downturned flanges 46 on the outer edges of the stiffening flanges 45 are secured to the inner sides of the slide frames 42 at 47. (See FIGS. 6 and 9.) Where two sections of the trough 3A and 3B are carried by the same slide frame they are secured in closely spaced end to end relation. A flat cross plate 48 bridges the space between the bottoms of the ends of the trough sections. The inclined bottom walls 44 terminate in spaced relation forming elongated delivery slots 49 between the ends of the trough sections. The screw auger 4 is made in sections corresponding to sections of the trough and the adjacent sections are drivingly connected by couplings 50. Vertical cross plates 51 on the bottoms of the slide frames 42 form supports for sections of the valve to be described.

The center valve shaft 34 supports and controls a first section 52A of an elongated valve of sector shaped cross section below the slot 49 in the first section of the trough. The valve, and other sections, thereof has a sector shaped periphery 53 that can be rotated into closing relation to the slot or rotated oppositely to variably open the slot with the lower apex 54 of the valve inclined downwardly to selectively opposite sides as appears in FIG. 8. As noted the shaft 34 and the crank 32 in the center of the drive supporting slide control the first section 52A of the valve. The control shaft 37 on the right side of the main platform slide 7 is connected by a universal joint 55 to a shaft 56 which inclines downwardly to a second universal joint 57 carried by shaft 58 on projecting side plates 59 on the side of the first slide frame 42A. (See FIGS. 1 and 7.) The shaft 58 has a sprocket 60 connected by the chain 61 to a sprocket 62 on the rear end of shaft 34B. The shaft 34B supports and regulates the second section 52B of the valve under the second section of the trough.

The control shaft 36 on the opposite side of the main slide extends forwardly through a side plate 63 on the side of slide frame 42A where it connects to a third universal joint 64 and a second downwardly inclined shaft 65. (See FIGS. 1 and 6.) The shaft 65 connects by mechanism not illustrated in detail but similar to the sprockets 60 and 62 and chain 61 to regulate the third section 52C of the valve. The valve 52C is supported by mechanism similar to that illustrated in FIGS. 6, 7, 8 and 9 from the second slide frame 42B.

With the foregoing sectional valve and separate controls for the sections thereof, all simultaneously vertically adjustable with the trough 3 over the bed 1, the distributor may be operated as shown in FIG. 8. The trough, valves and screw auger may be lowered to a low level and any selected valve section opened and tilted to the selected side of the bed as shown by the dotted position of the valve at 66. The other valve sections behind the operative open section are closed and the screw auger 4 is operated to advance feed from the hopper 67 and a suitable supply conveyor 68. As the material such as pelletized feed 69 in FIG. 8 reaches the open valve it spills through the open slot onto the selected feeding station of the bunker. As the material piles up it progressively stops off the slot 49 so that the feed is deposited and distributed further along the bunker until the feeding station is filled or the desired amount of feed is distributed. Normally the feeding station requiring the lowest pile of feed is selected to be filled first.

After the first feeding station is supplied the valves 52 can be adjusted to supply a like or greater amount to a different feeding station. The same or a different type of feed may be supplied to different stations. The full line position of the valve in FIG. 8 shows the trough and valves adjusted to supply a higher pile of silage 70 to a different feeding station on the opposite side of the bunker from the first feeding station. Depending upon the type of feed supplied to and by the delivery conveyor 68, a wide variety of feeds and feed mixtures can be delivered in variable amounts to different feeding stations. The length of the feeding stations can, of course, be selected to accommodate the demand. Additional distribution variation can be accomplished when feeding pellets, shelled corn, grain, or ground feed by loading the hopper with feed, then opening a selected valve or valves a selected amount and starting the auger. This carries the charge of feed in the hopper from the hopper and distributes it evenly over the selected area.

What is claimed as new is:

1. Cattle feeding apparatus comprising,
   an elongated feed bunker,
   an upright rectangular frame supported at one end of said bunker,
   a rectangular platform vertically slidably guided in said rectangular frame,
   at least three support frames mounted on said bunker in spaced relation to each other and said rectangular frame,
   box slides vertically slidably guided by said support frames,
   vertical adjusting screws connected to the tops of said platform and said slides and extending through the tops of said frames,
   worm wheels on the tops of said frames threadedly engaged with said screws,
   an elevating shaft extending along the tops of said frames and having worm sections engaged with said worm wheels,
   a first motor on said rectangular frame connected to said elevating shaft to raise and lower said frames,
   an elongated sectional trough supported on said platform and said slides and having side walls with inwardly inclined bottom walls spaced apart in the center to define a delivery slot,
   a screw auger rotatably positioned in said trough and supported upon said bottom walls,
   a motor on said platform drivingly connected to said auger,
   at least three elongated valve elements of sector shaped cross section rotatably supported by said slides and said platform under successive sections of said delivery slot,
   a first crank and worm mounted on the end of said platform and connected to the first section of said valve, second and third cranks and worms mounted on the opposite sides of said platform and connected to drive rods extending along the sides of said trough to successive sections of said valve elements, said valve elements being oppositely rotatably adjustable from a central position where the sector shaped periphery closes said delivery slot to oppositely inclined positions where the slot is variably opened and the apex of the valve is inclined selectively toward opposite sides of the bunker, and means for delivering feed to be distributed to the end of said screw auger and trough adjacent said platform.

2. Cattle feeding apparatus comprising, an elongated feed bunker, an upright rectangular frame supported at one end of said bunker, a rectangular platform vertically slidably guided in said rectangular frame, a plurality of support frames mounted on said bunker in spaced relation to each other and said rectangular frame, box slides vertically slidably guided by said support frames, vertical adjusting screws connected to the tops of said platform and said slides and extending through the tops of said frames, worm wheels on the tops of said frames threadedly engaged with said screws, an elevating shaft extending along the tops of said frames and having worm sections engaged with said worm wheels, a first motor on said rectangular frame connected to said elevating shaft to raise and lower said slides, an elongated trough supported on said platform and said slides and having side walls with inwardly inclined bottom walls spaced apart in the center to define a delivery slot, a screw auger rotatably positioned in said trough, a motor on said platform drivingly connected to said auger, a plurality of elongated valve elements of sector shaped cross section rotatably supported by said slides and said platform under successive sections of said delivery slot, a first crank and worm mounted on the end of said platform and connected to the first section of said valve, another crank and worm mounted on the side of said platform and connected to a drive rod extending along the side of said trough to the next section of said valve element, said valve elements being oppositely rotatably adjustable from a central position where the sector shaped periphery closes said delivery slot to oppositely inclined positions where the slot is variably opened and the apex of the valve is inclined selectively toward opposite sides of the bunker, and means for delivering feed to be distributed to the end of said screw auger and trough.

3. Cattle feeding apparatus comprising, an elongated feed bunker, a first frame supported at one end of said bunker, a platform vertically slidably guided in said first frame, a plurality of support frames mounted on said bunker in spaced relation to each other and said first frame, slides vertically slidably guided by said support frames, vertical adjusting screws connected to said platform and said slides and extending through the tops of said frames, worm wheels on the tops of said frames threadedly engaged with said screws, an elevating shaft extending along the tops of said frames and having worm sections engaged with said worm wheels, a first motor on said rectangular frame connected to said elevating shaft to raise and lower said slides, an elongated trough supported on said platform and said slides and having side walls with inwardly inclined bottom walls spaced apart in the center to define a delivery slot, a screw auger rotatably positioned in said trough, a motor on said platform drivingly connected to said auger, a plurality of elongated valve elements of sector shaped cross section rotatably supported by said slides and said platform under successive sections of said delivery slot, a first crank and worm mounted on said platform and connected to the first section of said valve, another crank and worm mounted on the side of said platform and connected to a drive rod extending along the side of said trough to the next section of said valve element, said valve elements being oppositely rotatably adjustable from a central position where the sector shaped periphery closes said delivery slot to oppositely inclined positions where the slot is variably opened and the apex of the valve is inclined selectively toward opposite sides of the bunker, and means for delivering feed to be distributed to the end of said screw auger and trough.

4. Cattle feeding apparatus comprising, an elongated feed bunker, a first frame supported at one end of said bunker, a platform vertically slidably guided in said first frame, a plurality of support frames mounted on said bunker in spaced relation to each other and said first frame, slides vertically slidably guided by said support frames, vertical adjusting screws connected to said platform and said slides and extending through the tops of said frames, worm wheels on the tops of said frames threadedly engaged with said screws, an elevating shaft extending along the tops of said frames and having worm sections engaged with said worm wheels, a first motor on said rectangular frame connected to said elevating shaft to raise and lower said slides, an elongated trough supported on said platform and said slides and having side walls with inwardly inclined bottom walls spaced apart in the center to define a delivery slot, a screw auger rotatably positioned in said trough, a motor on said platform drivingly connected to said auger, a plurality of elongated valve elements rotatably supported by said slides and said platform under successive sections of said delivery slot, a first crank and worm mounted on said platform and connected to the first section of said valve, another crank and worm mounted on said platform and connected to a drive rod extending along said trough to the next section of said valve element, said valve elements being oppositely rotatably adjustable from a central position where their periphery closes said delivery slot to inclined positions where the slot is variably opened, and means for delivering feed to be distributed to said screw auger and trough.

5. Cattle feeding apparatus comprising, an elongated feed bunker, a first frame supported at one end of said bunker, a platform vertically slidably guided in said first frame, a plurality of support frames mounted on said bunker in spaced relation to each other and said first frame, slides vertically slidably guided by said support frames, means connected to simultaneously raise and lower said platform and said slides, an elongated trough supported on said platform and said slides and having side walls with inwardly inclined bottom walls spaced apart in the center to define a delivery slot,
a screw auger rotatably positioned in said trough,
a plurality of elongated valve elements rotatably supported by said slides and said platform under successive sections of said delivery slot,
a first crank and worm mounted on said platform and connected to the first sections of said valve,
another crank and worm mounted on said platform and connected to a drive rod extending along said trough to the next section of said valve element,
said valve elements being oppositely rotatably adjustable from a central position where their periphery closes said delivery slot to inclined positions where the slot is variably opened,
and means for delivering feed to be distributed to said screw auger and trough.

6. Cattle feeding apparatus comprising,
an elongated feed bunker,
a first frame supported on said bunker,
a platform vertically slidably guided in said first frame,
a plurality of support frames mounted on said bunker in spaced relation to each other and said first frame,
slides vertically slidably guided by said support frames,
means connected to said platform and said slides and adjustably supporting the platform and frames,
a first motor on said first frame connected to said supporting means to raise and lower said frames,
an elongated trough supported on said platform and said slides and having side walls with bottom walls spaced apart in the center to define a delivery slot,
a screw auger rotatably positioned in said trough,
a second motor on said platform drivingly connected to said auger,
a plurality of elongated valve elements of sector shaped cross section rotatably supported under successive sections of said delivery slot,
a first crank and worm mounted on the end of said platform and connected to the first section of said valve element,
another crank and worm mounted on the side of said platform and connected to a drive rod extending along the side of said trough to the next section of said valve element,
said valve elements being oppositely rotatably adjustable from a central position where the sector shaped periphery closes said delivery slot to oppositely inclined positions where the slot is variably opened and the apex of the valve is inclined selectively toward opposite sides of the bunker,
and means for delivering feed to be distributed to the end of said screw auger and trough.

7. Cattle feeding apparatus comprising,
an elongated feed bunker,
a first frame supported on said bunker,
a platform vertically slidably guided in said first frame,
a plurality of support frames mounted on said bunker in spaced relation to each other and said first frame,
slides vertically slidably guided by said support frames,
means connected to said platform and said slides and adjustably supporting the platform and frames,
a first motor on said first frame connected to said supporting means to raise and lower said frames,
an elongated trough supported on said platform and said slides and having side walls with bottom walls spaced apart in the center to define a delivery slot,
a screw auger rotatably positioned in said trough,
a second motor on said platform drivingly connected to said auger,
a plurality of elongated valve elements rotatably supported under successive sections of said delivery slot,
a first crank and worm mounted on said platform and connected to the first section of said valve element,
another crank and worm mounted on said platform and connected to a drive rod extending along the side of said trough to the next section of said valve element,
said valve elements being adjustable from a position where the valve closes said delivery slot to positions where the slot is variably opened,
and means for delivering feed to be distributed to said screw auger and trough.

8. Cattle feeding apparatus comprising,
an elongated feed bunker,
a first frame supported on said bunker,
a platform vertically slidably guided in said first frame,
at least three support frames mounted on said bunker in spaced relation to each other and said first frame,
slides vertically slidably guided by said support frames,
vertical adjusting screws connected to said platform and said slides and extending through the tops of said frames,
worm wheels on the tops of said frames threadedly engaged with said screws,
an elevating shaft extending along the tops of said frames and having worm sections engaged with said worm wheels,
means on said first frame connected to said elevating shaft to raise and lower said slides,
an elongated sectional trough supported on said platform and said slides and having side walls with inwardly inclined bottom walls spaced apart in the center to define a delivery slot,
a screw auger rotatably positioned in said trough and supported upon said bottom walls,
a motor on said platform drivingly connected to said auger,
elongated valve elements supported by said slides and said platform under successive sections of said delivery slot,
a first valve adjusting means mounted on said platform and connected to the first section of said valve,
other valve adjusting means mounted on said platform and connected to drive rods extending along the sides of said trough to successive sections of said valve elements,
said valve elements being oppositely adjustable from a first position where the element closes said delivery slot to adjusted positions where the slot is variably opened,
and means for delivering feed to be distributed to said screw auger and trough adjacent said platform.

9. Cattle feeding apparatus comprising,
an elongated feed bunker,
a first frame supported on said bunker,
a platform vertically slidably guided in said first frame,
at least three support frames mounted on said bunker in spaced relation to each other and said first frame,
slides vertically slidably guided by said support frames,
vertical adjusting screws connected to said platform and said slides and extending through the tops of said frames,
worm wheels on the tops of said frames threadedly engaged with said screws,
an elevating shaft extending along the tops of said frames and having worm sections engaged with said worm wheels,
means on said first frame connected to said elevating shaft to raise and lower said slides,
an elongated sectional trough supported on said platform and said slides and having side walls with inwardly inclined bottom walls spaced apart in the center to define a delivery slot,
a screw auger rotatably positioned in said trough and supported upon said bottom walls,
a motor on said platform drivingly connected to said auger, elongated valve elements supported by said slides and said platform under successive sections of said delivery slot, a first valve adjusting means connected to the first section of said valve, other valve adjusting means connected to successive sections of said valve elements, said valve elements being oppositely adjustable from a first position where the element closes said delivery slot to adjusted positions where the slot is variably opened, and means for delivering feed to be distributed to said screw auger and trough.

References Cited in the file of this patent
UNITED STATES PATENTS

| | | |
|---|---|---|
| 2,867,314 | Hansen | Jan. 6, 1959 |
| 2,970,568 | Johnson | Feb. 7, 1961 |
| 2,981,402 | Cleaveland | Apr. 25, 1961 |
| 3,029,791 | Hacker | Apr. 17, 1962 |